Figure 3:
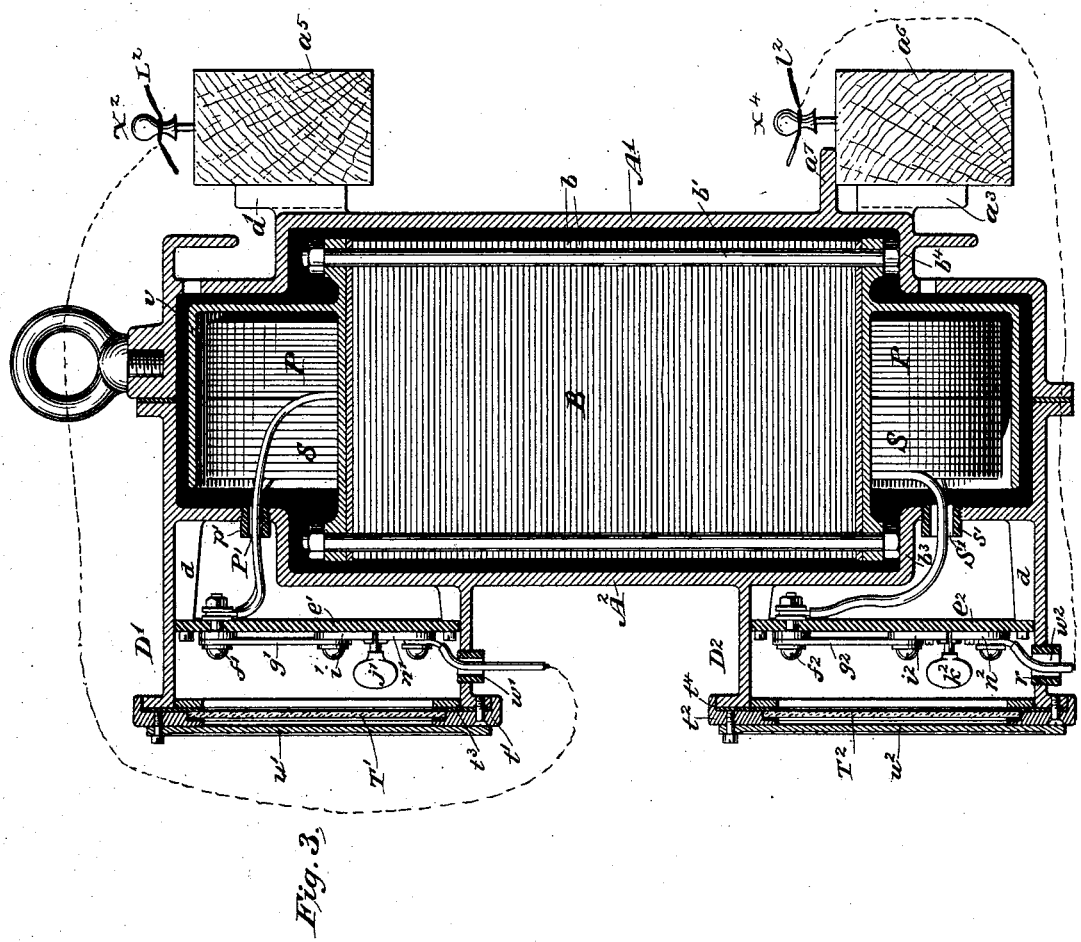

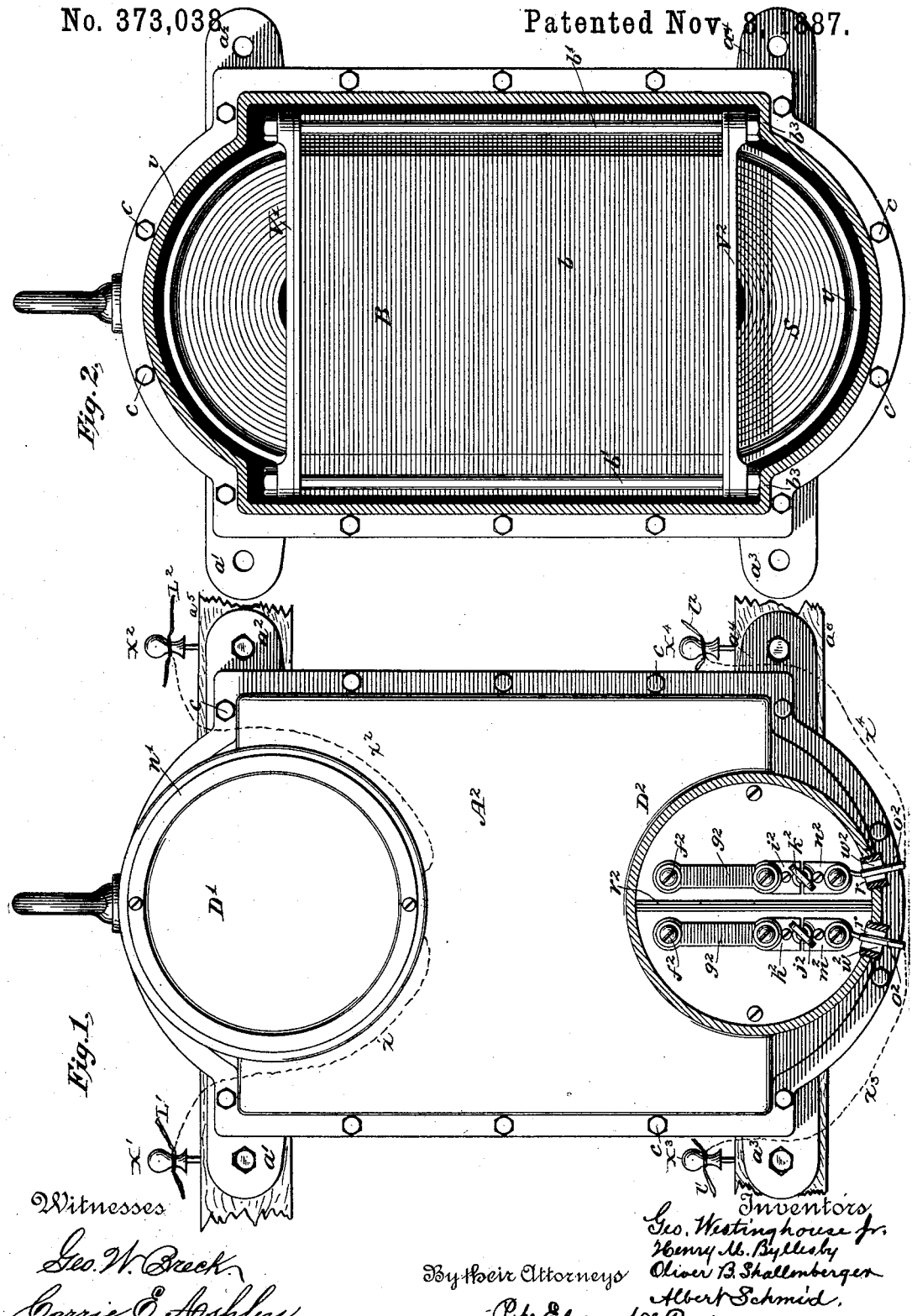

(No Model.) 2 Sheets—Sheet 2.

G. WESTINGHOUSE, Jr., H. M. BYLLESBY,
O. B. SHALLENBERGER & A. SCHMID.
CONVERTER BOX.

No. 373,038. Patented Nov. 8, 1887.

Witnesses
Geo. W. Breck
Carrie E. Ashley

Inventors
Geo. Westinghouse Jr.
Henry M. Byllesby
Oliver B. Shallenberger
Albert Schmid
By their Attorneys
Pope Edgcomb & Perry

UNITED STATES PATENT OFFICE.

GEORGE WESTINGHOUSE, JR., AND HENRY M. BYLLESBY, OF PITTSBURG, OLIVER B. SHALLENBERGER, OF ROCHESTER, AND ALBERT SCHMID, OF ALLEGHENY, PENNSYLVANIA.

CONVERTER-BOX.

SPECIFICATION forming part of Letters Patent No. 373,038, dated November 8, 1887.

Application filed March 30, 1887. Serial No. 232,934. (No model.)

*To all whom it may concern:*

Be it known that we, GEORGE WESTINGHOUSE, Jr., and HENRY M. BYLLESBY, citizens of the United States, residing in Pittsburg, in the county of Allegheny, OLIVER B. SHALLENBERGER, a citizen of the United States, residing in Rochester, county of Beaver, and ALBERT SCHMID, a citizen of the Republic of Switzerland, residing in Allegheny, and county of Allegheny, all of the State of Pennsylvania, have invented certain new and useful Improvements in Converter-Boxes, of which the following is a specification.

The invention relates to the construction of boxes for containing electric converters, and to the providing of means for securing electrical connections with the conductors placed therein.

The invention consists, in general terms, in constructing the main portion of the box in two parts, one of which is designed to be secured at the top and bottom to suitable supports—such, for instance, as the cross-arms placed upon poles in the manner adopted in constructing telegraph-lines—while the other section of the box is secured to the first-named section and carries two compartments, the one designed to receive the terminals of the primary and the other the terminals of the secondary coils of the converter. These compartments respectively contain circuit-controlling devices mounted upon plates of non-conducting material, and are closed by transparent plates, which permit them to be inspected. Metallic disks preferably cover the plates and protect them from injury.

The invention involves many details of construction, which will be hereinafter particularly pointed out.

In the accompanying drawings, Figure 1 is a front view, partly in section, of a converter-box. Fig. 2 shows a converter in position, and Fig. 3 is a transverse section of the box and converter.

Referring to the figures, A' represents the back section, and A² the front section, of the box, and B a converter placed within the box. The section A' is constructed with lateral lugs $a', a^2, a^3$, and $a^4$, for convenience in securing the same to cross-arms $a^5$ and $a^6$, or other convenient supports. A lateral flange or lug, $a^7$, rests upon the arm or support $a^6$. The arms $a^5$ and $a^6$ may form suitable supports for conveying the primary and secondary conductors, being properly distanced for that purpose.

In the drawings, two insulators, X' and X², are shown on the cross-arm $a^5$, and these carry primary conductors L' and L². The respective terminals of the primary coil are indicated as being connected by dotted lines $x'$ and $x^2$ with these two conductors L' and L². In like manner the cross-arm $a^6$ carries insulators X³ and X⁴, supporting conductors $l'$ and $l^2$, with which the respective terminals of the secondary coil are connected by conductors $x^3$ and $x^4$.

The front section, A², is bolted or otherwise securely fastened to the section A', as indicated at $c\ c$. This section A² carries two compartments, D' and D², formed by annular webs or lugs, being thrown out from the casting. The terminals of the primary coil P of the converter are led through suitable openings, P', in the casting into the compartment D'. The terminals of the secondary coil S are led in like manner through openings S' into the compartment D². These compartments are preferably constructed with inwardly-projecting lugs $d\ d$, against which there are fastened non-conducting plates $e'$ and $e^2$. These are of fiber, hard rubber, or other suitable material. The primary conductors are fastened to bolts or coupling-screws $f'$, (only one of which is shown,) these being fastened to and extending through the plate $e'$. The terminals of the secondary coil are in like manner connected upon the under side of the plate $e^2$ with coupling-screws $f^2$. The connections are continued from these screws, through fusible switch-plugs or strips $g^2$, to switch-plates $h^2$ and $i^2$, respectively. These plates are connected, at will, by corresponding switch-plugs, $j^2$ and $k^2$, with other contact or switch-plates, $m^2$ and $n^2$. The conductors $o^2\ o^2$ lead from the plates $m^2$ and $n^2$, respectively, through suitable openings, $w^2\ w^2$, in the lower side of the plate or web forming the compartment D², such openings being lined with fiber or other suitable non-conducting tubes or thimbles, as shown at $r\ r$. For the purpose of completely insulating the fusible strips and their connected conductors from each other, a plate of fiber or other insulating material $r^2$ is placed across the compartment $D^2$, thus preventing an accidental short-circuit being formed. The openings P' and S' are also preferably constructed with non-conducting thimbles $p'$ and $s'$, serving to prevent contact between the iron of the case and the conductors leading through the openings.

The box or compartment D' is in like manner equipped with circuit-controlling and safety devices, as indicated at $g'$, $i'$, $j'$, and $n'$, connected with the respective terminals of the primary coil, and the primary conductors lead through suitable openings, $w'$, at the bottom of the compartment.

The outer ends of the compartments D' and $D^2$ are closed securely by glass plates T' and $T^2$, respectively, and these are preferably held in position by annular clamps $t'$ and $t^2$ and rubber washers $t^3$ and $t^4$. The plates of glass allow the circuit-connections to be inspected without opening the box. For their better preservation, however, disks $u'$ and $u^2$ are preferably fastened in front of the plates in such manner that they may be easily removed or swung aside when desired.

The converter, as shown in the present instance, consists of the two coils P and S, surrounded by plates of iron, $b$, the plates being secured together by bolts $b'\,b'$. The converter-box is constructed to conform in general shape to the converter, and when placed in position the ends of the rods holding the plates rest upon the shoulders $b^3$ and $b^4$.

For the purpose of preventing the wires of the coil from coming into contact with the iron of the case, suitable shields, $v$ and $v^2$, may be made to project over the ends of the coils, such shields constituting hoods formed upon plates V' $V^2$, fastened to the ends of the core formed by the plates $b$.

We claim as our invention—

1. A converter-box constructed in two sections, the one provided with means for securing it to supports and the other having two separate compartments for receiving the primary and secondary circuit-controlling devices.

2. A converter-box constructed in two parts, the one being provided with separate compartments formed by lateral webs, non-conducting plates within said compartments, and circuit-controlling devices carried upon said plates.

3. The combination, with a box for containing an electric converter, of two independent compartments integral therewith for receiving the primary and secondary terminals, respectively, non-conducting plates within said compartments, independent circuit-controlling devices for the respective primary and the respective secondary conductors carried by said plates, and non-conducting plates between the respective circuit-controlling devices in each compartment.

4. The combination, with a box for containing an electric converter, of independent compartments integral therewith for containing the primary and secondary circuit-controlling devices, and transparent plates closing said compartments.

5. The combination, with a box for containing an electric converter, of independent compartments integral therewith for containing the primary and secondary circuit-controlling devices, transparent plates closing said compartments, and protecting disks outside said plates.

6. The combination, with an electric converter, of supports for the primary and secondary conductors, respectively, and a box containing the converter secured at one end to the support of the primary conductors and at the other end to the support of the secondary conductors.

7. The combination, with an electric converter, of supports for the primary and secondary conductors, respectively, a box containing the converter, secured at one end to the support of the primary conductors and at the other end to the support of the secondary conductors, a compartment for receiving the terminals of the primary coils of the converter, a second compartment for receiving the terminals of the secondary coils of the converter, and openings at the bottom of the respective compartments for receiving conductors leading to the primary and secondary coils, respectively.

8. The combination, with an electric converter and a box containing the same, of hoods of non-conducting material intervening between the converter-coils and the metal of the box, substantially as described.

In testimony whereof we have hereunto subscribed our names this 23d day of March, A. D. 1887.

GEO. WESTINGHOUSE, Jr.
  HENRY M. BYLLESBY.
  OLIVER B. SHALLENBERGER.
  ALBERT SCHMID.

Witnesses:
  WALTER D. UPTEGRAFF,
  W. L. McCULLAGH.